United States Patent [19]

Heiss et al.

[11] 4,451,381

[45] May 29, 1984

[54] COMPOSITE PLUG FOR STAKE-HOLE OF SALT BLOCKS, SALT BLOCK PRODUCT, AND METHOD OF USING SAME

[75] Inventors: John F. Heiss, St. Clair; Richard Kolasinski, Richmond, both of Mich.

[73] Assignee: Diamond Crystal Salt Company, St. Clair, Mich.

[21] Appl. No.: 402,096

[22] Filed: Jul. 26, 1982

[51] Int. Cl.³ .......................... B65D 85/84; B32B 9/04
[52] U.S. Cl. ........................................... 252/1; 137/13;
252/176; 210/670; 206/216; 206/524.5;
206/524.7; 206/525; 206/819; 206/822;
428/696; 428/697; 428/701; 423/658.5;
423/499; 239/34
[58] Field of Search ..................... 252/90, 92, 93, 176,
252/179, 420, 1; 422/902; 210/190, 670, 673,
687; 206/216, 524.5, 524.7, 525, 819, 822;
428/696, 699, 701, 697, 688, 411

[56] References Cited

U.S. PATENT DOCUMENTS

| | | | |
|---|---|---|---|
| 2,020,072 | 11/1935 | Lowenstein | 206/524.5 X |
| 3,154,494 | 10/1964 | Speak et al. | 252/93 |
| 3,185,699 | 5/1965 | Hampson et al. | 252/90 |
| 3,216,932 | 11/1965 | Heiss et al. | 210/673 X |
| 3,227,524 | 1/1966 | White | 422/902 X |
| 3,623,992 | 11/1971 | Kolasinski | 252/179 X |
| 3,887,468 | 6/1975 | Bray | 210/206 |

Primary Examiner—Benjamin R. Padgett
Assistant Examiner—Matthew A. Thexton
Attorney, Agent, or Firm—Harness, Dickey & Pierce

[57] ABSTRACT

A salt block product and method of making and using same of a type suitable for use in forming a brine for regenerating and rejuvenating water conditioning ion exchange beds comprising integral block of salt having a stake hole extending inwardly of one surface thereof within which a mass of a water soluble rejuvenating agent is disposed at a position spaced inwardly of the surface of the block. The rejuvenating agent can comprise one or an admixture of additive agents which are adapted to dissolve in the water during the dissolution of the salt block forming a brine containing the additive agent uniformly distributed therethrough. In accordance with a preferred embodiment, a suitable closure is positioned in the stake hole outwardly of the additive agent to prevent deterioration thereof during shipment and storage which alternatively can be physically removed or is adapted to dissolve releasing the additive agent during the brine generating process. The additive agent is disposed in the stake hole in the form of a loose particulated material, in the form of a solidified mass and preferably in the form of a consolidated tapered plug interlockingly engaged with the walls defining the stake hole.

19 Claims, 6 Drawing Figures

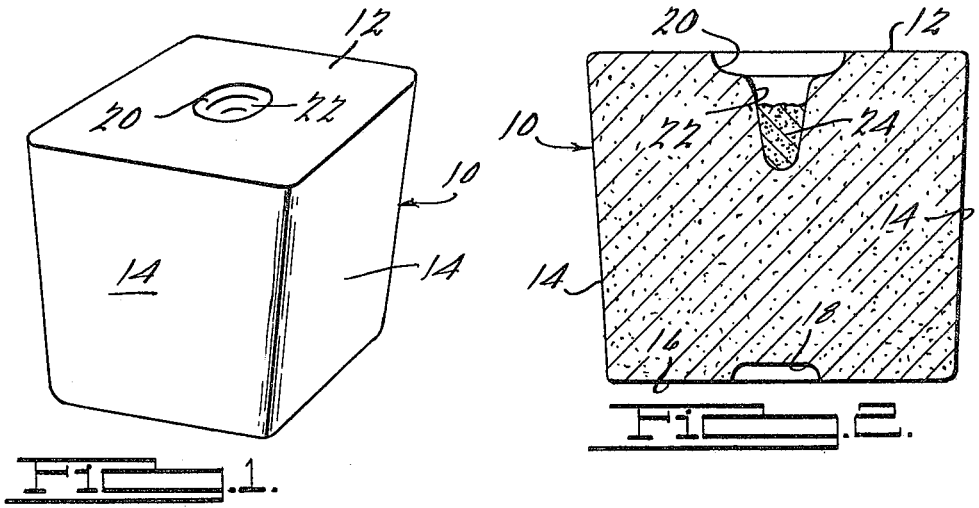
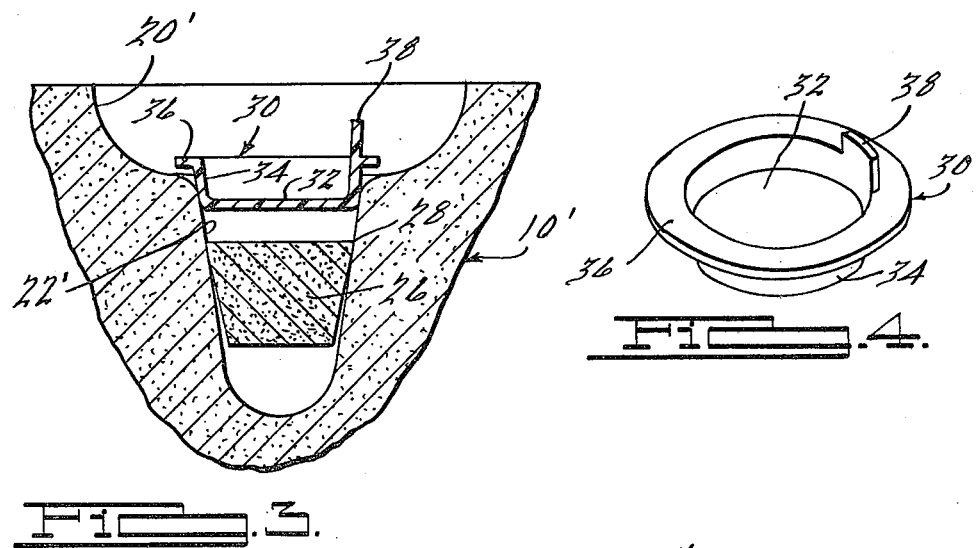
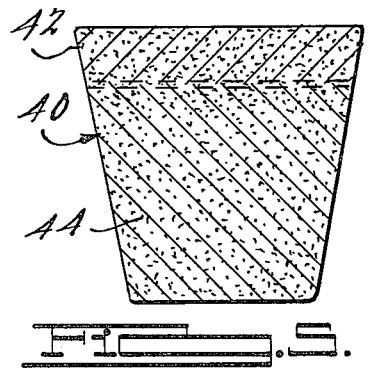
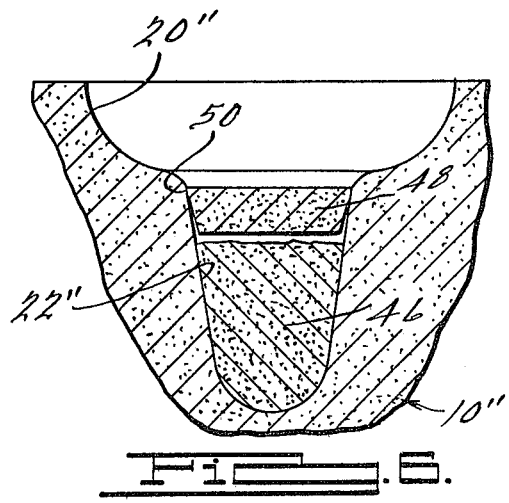

COMPOSITE PLUG FOR STAKE-HOLE OF SALT BLOCKS, SALT BLOCK PRODUCT, AND METHOD OF USING SAME

BACKGROUND OF THE INVENTION

The present invention broadly relates to an improved salt product containing a controlled quantity of selected additives suitable for dissolution in water for generating a brine usable for regenerating and rejuvenating fouled ion exchange resins of the type employed in water conditioning systems.

It has heretofore been proposed to employ various additive agents as an absorbed coating on salt particles or blocks as well as in the form of a uniform mixture in a compacted salt block for the rejuvenation of ion exchange resins during the regeneration process. Many water supplies contain soluble and insoluble iron in addition to dissolved metals such as calcium, magnesium, and the like which contribute toward hardness. Such iron bearing waters are conducive to the growth of iron bacteria also known as iron crenothrix. The growth of such iron bacteria in the water supply mains, recirculating systems and water-conditioning ion-exchange beds results in a progressive clogging action causing reductions in water flow rates as well as contributing to bad taste and odors in the water. While some large commercial water treatment installations are equipped with means for converting soluble iron to insoluble iron and removing the resultant precipitate by filtration, such filtration systems are costly and are not economically suited to small commercial and domestic or household installations. Conventionally, small commercial and domestic water conditioning systems employ ion exchange resin beds which while satisfactory for removing low concentrations of iron in the water become progressively less efficient over prolonged use due to an accumulation of the iron present within the resin bed preventing complete regeneration thereof and resulting in carry-over of iron into the treated water.

Typical of prior art processes and salt products for use in the formation of brines suitable for the regeneration and rejuvenation of such ion exchange resin beds are the salt products described in U.S. Pat. No. 3,216,932 in which various additive agents are uniformly distributed through a compacted particulated salt aggregate and the coated rock salt products as described in U.S. Pat. No. 3,623,992. In accordance with the teachings of the two aforementioned United States patents, it has been observed that the application of one or a mixture of rejuvenating agents in the form of an absorbed coating on the surfaces of salt aggregates has the disadvantage in that the quantities of such additives incorporated are limited by the degree of absorbency of such salt aggregates. Additionally, the uniform admixture of such additive agents with particulated salt which subsequently is compacted into larger aggregates such as briquettes, blocks and the like, has the disadvantage of requiring blending equipment for forming the uniform mixture prior to compaction and wherein certain of the additives employed may be of a corrosive nature attacking not only the blending equipment but also the dies and associated equipment employed in forming the compacted aggregates. The use of particulated mixtures of salt and such additive agents has the further disadvantage of potential cross-contamination of succeeding salt aggregates containing different additive agents or no additive agents at all such as in the case of animal feed blocks or "salt licks". Salt aggregates incorporating the additive agents uniformly distributed therethrough are further subject to the disadvantage of inflexibility in changing the concentrations and/or types of constituents employed to provide salt products adapted for specific end uses. In some instances, the additive agents may be of an acidic or corrosive nature necessitating that the aggregate such as a compacted salt block be encapsulated within a suitable acid resistant liner such as polyethylene film to avoid exposure to the skin during handling. Additionally, some additive agents may be of a thermally unstable character resulting in some decomposition and/or deterioration thereof during the compaction of the particulated salt mixture which may occur at temperatures of up to about 150° F.

The present invention overcomes many of the problems and disadvantages associated with salt products incorporating additive agents of the types heretofore known by providing an aggregated salt product in which the additive agent is disposed at a position remote from the surfaces thereof facilitating handling of the aggregates during shipment, storage and ultimate use; in which extreme versatility and flexibility is provided in the manufacture of such salt products with respect to the particular quantity and type of additives incorporated, in which potential cross-contamination of succeeding salt products produced in the same manufacturing operation is substantially completely eliminated, in which the use of protective wrappings or liners is obviated, and wherein the salt product is of simple, economical and versatile manufacture and use.

SUMMARY OF THE INVENTION

The benefits and advantages of the present invention are achieved by a salt product such as a block or the like comprising an integral compacted mass of sodium chloride salt formed with an aperture or stake hole extending inwardly of one surface into the interior thereof. The rejuvenating agent is disposed in the form of a mass within the stake hole and is positioned inwardly of the exterior surface at a position remote from contact by persons handling such aggregates during manufacture, shipment and storage. The mass of rejuvenating agent or mixtures thereof may be in the form of a particulated material disposed within the stake hole and sealed therein by means of a soluble plug or closure means disposed outwardly of the rejuvenating agent; in the form of a solidified or hardened mass interlocked within the stake hole; and preferably in the form of a compacted integral plug of a tapered configuration interlocked within the stake hole. When the rejuvenating agent is comprised of a substance or mixture of substances which are hygroscopic or otherwise subject to deterioration when exposed to ambient atmospheric conditions, it is preferred to employ suitable closure means such as a flexible removable closure member which can be physically removed from the stake hole just prior to use of the salt product, or alternatively, in the form of an aqueous or brine soluble plug which is adapted to dissolve during immersion of the salt product during the brine generation process releasing the rejuvenating agent for dissolution in the subsequently formed brine.

The rejuvenating or additive agent may comprise any one or a mixture of a variety of constituents to achieve the intended end purpose when dissolved in the brine solution of which a combination of sodium bisulfate and monosodium phosphate employed in approximately equal amounts has been found particularly satisfactory as a rejuvenating agent of fouled ion exchange resin beds.

In accordance with the method aspects of the present invention, the salt block is compacted from a mass of particulated salt particles into a self-sustaining structure and incorporating a stake hole therein. The additive agent, on the other hand, depending upon the particular form in which it is employed, is separately introduced into the stake hole and preferably thereafter substantially sealed therein by using suitable closure means.

In accordance with the use aspects of the present invention, the salt product incorporating the additive agent is placed in a receptacle for brine generation in a manner so as to effect a concurrent dissolution of the salt constituent and the additive agent providing a brine composition of the desired concentration.

Additional benefits and advantages of the present invention will become apparent upon a reading of the Description of the Preferred Embodiments taken in conjunction with the accompanying drawing.

BRIEF DESCRIPTION OF THE DRAWING

FIG. 1 is a perspective view of a compacted salt product in the form of a substantially cubical block formed with a stake hole extending inwardly of the upper surface thereof;

FIG. 2 is a transverse vertical sectional view through the block shown in FIG. 1;

FIG. 3 is a fragmentary magnified vertical sectional view of a salt block incorporating an additive plug and a flexible closure in the stake hole thereof;

FIG. 4 is a perspective view of a resilient cap plug of the type shown in FIG. 3;

FIG. 5 is a magnified vertical sectional view of a composite additive plug incorporating an upper layer of a soluble salt material; and FIG. 6 is a fragmentary magnified vertical sectional view of a salt block incorporating the additive agent in the form of a particular mass and sealed therein by means of a soluble plug disposed in the stake hole.

DESCRIPTION OF THE PREFERRED EMBODIMENTS

Referring now in detail to the drawing, and as may be best seen in FIGS. 1 and 2, a salt product in the form of a three dimensional generally cubical block 10 is illustrated defining an upper surface 12, four tapered side surfaces 14 and a bottom surface 16. The side surfaces 14 are preferably provided with a slight downward taper as best seen in FIG. 2 and the corners are preferably slightly rounded to provide a draft angle to facilitate removal of the salt block after compaction from the mold or die. The bottom surface 16 is provided with a depression or hand hold 18 and the upper surface 12 similarly is provided with a depression or hand hold 20 to facilitate gripping the block during physical handling. An aperture or stake hole 22 of a generally circular and axially tapered configuration as shown in FIG. 2 extends inwardly of the body of the salt block centrally of the hand hold 12 in the upper surface thereof.

Salt blocks of the foregoing type are well known in the art and are in widespread use as "salt licks" serving as a source of salt for animals on pasture, etc. as well as a means for brine generation in water-conditioning systems in both domestic and commercial systems. Typically, such salt blocks are produced as 50-pound blocks by compacting granular sodium chloride salt particles in a hydraulic press under pressures ranging from about 500 to about 700 tons per block. The particle size of the particulated salt is not critical and may comprise evaporated salt, granular rock or solar salt, purified salt crystals or granules, flake salt such as Alberger Flake Salt and the like. The hydraulic compaction of the salt particles can be performed at room temperature to temperatures up to about 120° F. with some additional temperature rise of up to about 50° F. occurring during the pressing operation.

A 50-pound salt block of the type illustrated in FIGS. 1 and 2 has an upper surface 12 about 8 and ½ inches square and a bottom surface 16 about 8 inches square providing a quarter inch taper along the 10 inch height of the block. The stake hole 22 facilitates placing the block in an inverted position on a stake in the pasture or the like as a source for animals in the field.

In accordance with the present invention, such conventional salt blocks can be simply and economically converted into salt blocks for brine-making incorporating any one of a variety of controlled additive agents in varying amounts to effect a rejuvenation of ion exchange beds in domestic and commercial water conditioning systems. For this purpose, the additive agent or mixture of additive agents is placed within the stake hole at a position in which it is not readily contacted by the hands or fingers of persons handling the block during shipment, storage and ultimate placement in a brine-making tank. In accordance with the several embodiments as illustrated in the drawing, the additive agent or mixture thereof can be disposed in the stake hole in the form of a solidified mass, in the form of a plug interlocked within the stake hole as well as in the form of a loose powder further incorporating closure means to substantially seal the additive agent within the stake hole prior to use.

The additive agent may comprise any one or combinations of the various agents heretofore proposed for use as additives for brine making operations which are effective in controlled amounts to provide beneficial properties and/or a rejuvenation of ion exchange resin beds prolonging their efficiency and useful operating life. Included among such additives are those described in U.S. Pat. Nos. 3,216,932 and 3,623,992 which are assigned to the same assignee as the present invention and the teachings of which are incorporated herein by reference. Briefly stated, the additive according to U.S. Pat. No. 3,216,932 comprises a water soluble particulate material including a mineral acid or an acid salt providing a mineral acid radical in aqueous solution, a di-alkali metal sulfonate of an alkylated diphenyl ether and a di-alkali metal sulfonate of di-naphthyl methane. According to U.S. Pat. No. 3,623,992, the additive agent comprises a mixture of sodium bisulfate ($NaHSO_4$) and monosodium phosphate ($NaH_2PO_4$). In addition to the foregoing and other active ingredients in the additive agent, it is also contemplated that optional ingredients such as corrosion inhibitors, coloring agents or dyes, bactericides, and the like can optionally be admixed with the active constituents provided that they are compatible with the other constituents and are brine soluble.

Among other suitable sanitizing agents, bactericides and resin cleaning agents that can be incorporated in the rejuvenating agent are water-soluble solid organic acids such as citric, tartaric, sulfamic, sulfosalicylic, malic, maleic, succinic, itaconic acids and the like such as disclosed in U.S. Pat. No. 2,769,787, the substance of which is incorporated herein by reference; alkali-metal and ammonium salts of selected polyphosphoric acid compounds which inhibit the corrosive effect of the brine solution as described in U.S. Pat. No. 2,977,313 the substance of which is also incorporated herein by reference.

The specific concentration or quantity of additive agent employed can readily be varied to provide optimum performance in the ultimate brine making and water conditioning operation. Of the various additives that can be used, a mixture comprising substantially equal amounts by weight of sodium bisulfate and monosodium phosphate constitutes a preferred material for rejuvenation of ion exchange resin beds. Typically, such a mixture can be employed in an amount of about 100 grams in a 50-pound salt block of the type illustrated in FIGS. 1 and 2 to provide appropriate pH control and efficient rejuvenation of the conditioning system.

Referring now in detail to FIG. 2, an additive agent in the form of a solidified mass 24 is disposed within the inner portion of the stake hole 22 and is mechanically or adhesively interlocked therein. The solidified mass 24 is conveniently introduced by pouring a premeasured quantity of liquid in molten or solution form into the stake hole after the block has been formed which is subsequently allowed to cure or solidify into an interlocked mass. For example, approximately 100 grams comprising 50 grams of sodium bisulfate and 50 grams of monosodium phosphate can be fused or melted by heating to an elevated temperature and poured into the stake hole 22 whereafter it is allowed to cool and solidify to form the mass 24. Alternatively, a liquid slurry or solution of the additive agent can similarly be poured into the stake hole incorporating a suitable water soluble binder which upon setting or curing produces a solidified mass.

In accordance with an alternative embodiment as illustrated in FIG. 3, a salt block 10' having a hand hold 20' and a stake hole 22' is provided in which a circular tapered plug 26 comprised of a compacted or molded mass of the additive or additive agents is disposed with the upper peripheral edge indicated at 28 wedgingly engaged against the tapered circular wall defining the stake hole 22'.

Typically, the plug 26 comprised of a substantially equal mixture of sodium bisulfate and monosodium phosphate in granular form can be admixed and compacted in a press under pressures usually ranging from about 15 to about 20 tons per plug forming an integral shape retaining mass. Such plugs can simply be introduced into the stake hole and engaged therein by a light tapping to prevent inadvertent release during subsequent storage, shipment and handling. A plug 26 produced in accordance with the foregoing manner is slightly frangible such that the peripheral edge 28 on insertion and tapping into the stake hole 22' fractures slightly or crushes radially inwardly increasing the surface area of engagement of the plug thereby increasing its interlocking relationship. A 100 gram pellet or plug for use with a 50-pound salt block would typically be of a shape with its upper surface 1.75 inch in diameter, its lower surface 1.25 inches in diameter and a length of 1.75 inches. Such plugs of varying proportions and/or composition can readily be color coded to facilitate assembly depending upon intended end use. The diameter of the upper portion of the plug 26 as shown in FIG. 3 is selected so as to engage the wall defining the stake hole 22' at a position such that the lower end thereof does not bottom in the base of the stake hole and wherein the upper surface of the plug is spaced inwardly of the hand depression 20'.

In accordance with a further embodiment as illustrated in FIG. 3, a closure member 30 can optionally but preferably be employed for substantially sealing the plug of additive agent in the stake hole. The closure member 30 may be in the form of a removable resilient cap plug of a circular and inverted hat-shaped cross section defining a circular closure wall 32 connected along its periphery to a tapered side wall 34 which terminates at its upper end by a radially extending flange 36. The closure member 30 may suitably be comprised of a resilient plastic material such as polyvinyl chloride, for example ehich can be wedged into the upper portion of the stake hole 22' after the plug 26 has been inserted. For convenience, the closure member 30 is further provided as best seen in FIGS. 3 and 4 with an integral upwardly projecting pull tab 38 to facilitate a removal of the closure member prior to placement in a brine-making tank.

The use of a closure member is desirable when the additive agent composition is subject to deterioration when exposed to normal ambient atmospheric conditions such as hygroscopic materials which tend to take up water and dissolve from the humidity in the air. The use of the closure member 30 similarly can be applied to the embodiment illustrated in FIG. 2.

In accordance with still another alternative embodiment as shown in FIG. 5, a composite tapered plug 40 is illustrated of a general configuration similar to the plug 26 described in connection with FIG. 3. The composite plug 40 comprises an upper stratum or layer 42 comprised of a water soluble compatible material which is integrally formed with the lower stratum or layer 44 comprised of the additive material itself. The upper layer 42 is preferably comprised of sodium chloride salt itself which is adapted to dissolve exposing the additive layer 44 when the salt block is placed in a brine-making tank. The use of such a composite plug obviates the need of a separate mechanical closure member such as the closure member 30 shown in FIG. 3 which must be physically removed prior to placement of the salt block in a brine tank. The plug 40 can readily be fabricated as in the case of the plug 26 previously described by compacting a particulated mass of the additive material having superimposed thereon a particulate layer of the inert water soluble material such as sodium chloride forming an integral plug 40.

In accordance with still another embodiment of the present invention, and with reference to FIG. 6, a salt block 10" having a hand hold 20" and a stake hole 22" is provided which is adapted to be filled with particles or pellets of additive material in loose free flowing form such as indicated at 46 in FIG. 6. The powder mixture 46 is substantially sealed within the lower portion of the stake hole 22" by means of a water soluble closure member 48 which is resistant to ambient deterioration and which preferably comprises compacted sodium chloride itself. The closure member 48 similarly is formed of a tapered configuration such that the upper peripheral edge 50 thereof interlockingly engages and becomes wedged within the upper portion of the stake hole 22". It is also comtemplated that a mechanical type closure member such as the closure member 30 can be employed in the embodiment of FIG. 6 although a brine-soluble plug is preferred.

In accordance with the process aspects of the present invention in which the salt clock containing the additive agent is employed for producing a brine solution suitable for regenerating and rejuvenating ion exchange resin beds, a salt product of the general type as hereinbefore described is placed in a brine generating tank of any of the types known in the art by which a concurrent dissolution of the sodium chloride block and the additive agent is achieved to provide a brine of the appropriate composition. In the case of salt products in which a mechanical closure member such as the closure member 30 is employed, such closure member is first physically removed to expose the additive agent to contact with the brine solution. In those instances in which a water soluble closure member is employed such as the closure member 48 or a composite additive plug incorporating a soluble stratum 42 as in the case of the plug 40 of FIG. 5, a progressive dissolution of the salt plug or stratum first occurs whereafter the additive agent is exposed and progressively dissolves in the brine. Depending on the particular composition and condition of the additive agent, the additive agent in the salt product may completely dissolve before the entire salt block is consumed. Such action does not detract from the effectiveness of the additive agent for rejuvenating the ion exchange bed.

In order to further illustrate the present invention, the following specific examples are provided. It will be appreciated that the examples are provided for illustrative purposes and are not intended to be limiting of the scope of the present invention as herein described and as set forth in the subjoined claims.

EXAMPLE 1

A 50-pound white evaporated salt block, called "brine block", produced by compaction under 750 tons, was used to demonstrate the method of inserting the cork-shaped plug containing the active, acidic rejuvenating agents into the stake hole. The stake hole was of the configuration as shown in FIG. 3 having an outer diameter of about $1\frac{7}{8}$ inches, an inner diameter spaced upwardly from the hemispherical base of about $1\frac{1}{4}$ inches and a depth of about $2\frac{1}{2}$ inches. The depth of the hand hold 20' as shown in FIG. 3 was about $\frac{7}{8}$ inch. A previously proven formula for the dry-acid ingredients, consisting of 0.22% sodium bisulfate ($NaHSO_4$) and 0.22% sodium dihydrogen phosphate ($NaH_2PO_4$) based on the weight of the final product, was used. For a 50-pound salt block 50 grams of granular bisulfate and 50 grams of granular phosphate were required giving a measured volume of 85 ml. before compression.

The size and shape of the plug was designed so that after insertion it would be as deep inside the stake hole as possible without touching the bottom and also would be capable of manual insertion, having a taper such that the plug could be firmly wedged into the stake hole without using excessive pressure.

In order to meet these requirements a cork-shaped tapered plug $1\frac{1}{4}$ inch in diameter at the small end, $1\frac{3}{4}$ inch in diameter at the large end and approximately $1\frac{3}{4}$ inch long was compressed in a steel mold at 10 tons pressure. This plug was dropped into the stake hole and tapped down into position using a cylindrical punch slightly less than $1\frac{3}{4}$ inch in diameter and a hammer. The outer top surface of the plug after being tapped into firm frictional interlocking engagement in the stake hole was spaced about $\frac{3}{4}$ inch from the base of the hand hold 20' of FIG. 3.

The product block containing the tapped-in plug was treated to rough handling, such as dropping the block until pieces of the block broke off. However, the plug was not dislodged and no pieces of it fell out, showing that this product could be handled and shipped by rail or truck with the plug remaining intact in the stake hole if protected from ambient air and humidity by a cap-seal at the top of the stake hole.

EXAMPLE 2

The plug described in Example 1 was completely dissolved in water and also in salt brine of various concentrations under conditions simulating commercial salt dissolvers, resulting in an acidic brine suitable for reducing iron fouling of cation exchange resins in water softening equipment.

EXAMPLE 3

Instead of compressing the granulated rejuvenating agents into a cork-shaped plug as in Example 1, a fusion method was used with the same mold as before. A mixture of 100 grams of equal amounts of $NaHSO_4$ and $NaH_2PO_4$ was fused in a crucible held over a Bunsen burner in a laboratory hood. Some fumes were given off, indicating possible reaction or decomposition of the mixture. The final molten mixture was cast into the mold of Example 1 and on cooling formed a smooth-walled, cork-shaped plug, with a slight depression in the center of the plug, which caused no dimensional difficulties. The fused plug fit snugly and tightly when tapped into the stake hole.

In order to check on possible decomposition of the rejuvenating agents because of fusion, the acid content of the plug of Example 1 was compared to the acid content of the fused plug and no significant difference was observed.

EXAMPLE 4

In order to avoid the use of a mold when fusing and casting the cork-shaped plugs, as in Example 3, the fused acidic ingredients were poured directly into the stake hole. When cooled, the acidic mixture tightly adhered to the walls of the stake hole and could not be dislodged by rough handling of the block, even in an inverted position.

EXAMPLE 5

In a test similar to Example 4 Hemisodium phosphate ($NaH_2PO_4.H_3PO_4$) from Victor Chemical Works, Division of Stauffer Chemical Company, was fused over a Bunsen flame and poured into the stake hole, where it solidified in a few minutes and could not be dislodged thereafter by rough handling.

EXAMPLE 6

The brine block in Example 5 was placed with the stake hole resting on a porous grid plate 4 inches above the base of a sink in the R & D laboratory. Dissolving was started in the morning with the water level controlled at about $\frac{1}{4}-\frac{1}{2}$ inch above the grid plate. During the late afternoon, the block was lifted from the grid plate several times and it was observed that the Hemisodium phosphate in the stake hole was dissolving readily along with the salt, leaving no residue of phosphate on the grid plate.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A salt block suitable for use in forming a brine for regenerating and rejuvenating water conditioning ion exchange beds comprising an integral mass of salt in the form of a three dimensional block, a stake hole extending inwardly of one surface of said block into the interior thereof, and a mass of a water soluble rejuvenating agent disposed in said stake hole and positioned inwardly of said one surface.

2. The salt block as defined in claim 1 further including closure means disposed in substantial sealing relationship in said stake hole and positioned outwardly of said rejuvenating agent.

3. The salt block as defined in claim 1 in which at least a portion of said stake hole is defined by a generally tapered wall of decreasing cross sectional area on moving inwardly of said one surface.

4. The salt block as defined in claim 2 in which said closure means comprises a removable resilient cap plug.

5. The salt block as defined in claim 2 in which said closure means comprises a water soluble plug.

6. The salt block as defined in claim 3 in which said mass of rejuvenating agent is in the form of an integral tapered plug disposed in interlocking engagement within said stake hole.

7. The salt block as defined in claim 1 in which said mass of rejuvenating agent is in the form of a particulated material and closure means disposed in substantial sealing relationship in said stake hole disposed outwardly of said particulated material.

8. The salt block as defined in claim 1 in which said mass of rejuvenating agent is in the form of a solidified mass within said stake hole.

9. The salt block as defined in claim 1 in which said mass of rejuvenating agent is in the form of a composite tapered plug disposed in interlocking engagement within said stake hole, the inner axial portion of said composite plug comprised of said rejuvenating agent and the outer axial portion of said plug adjacent said one surface comprised of a water soluble material.

10. The salt block as defined in claim 5 in which said water soluble plug is comprised of salt.

11. The salt block as defined in claim 9 in which said outer axial portion of said plug is comprised of salt.

12. The salt block as defined in claim 6 in which the axial taper of said plug is greater than the axial taper of said wall of said stake hole thereby effecting frictional interlocking engagement of said plug along the outer peripheral edge against said tapered wall of said stake hole.

13. A salt block as defined in claim 1 in which said rejuvenating agent comprises a mixture of sodium bisulfate and monosodium phosphate.

14. The salt block as defined in claim 1 in which said rejuvenating agent comprises a mixture of substantially equal amounts by weight of sodium bisulfate and monosodium phosphate.

15. A plug suitable for insertion in an aperture formed in an integral mass of salt for regenerating and rejuvenating water conditioning ion exchange beds comprising a composite mass including a first portion comprised of a water soluble material and a second portion integrally attached to said first portion comprised of a water soluble rejuvenating agent.

16. The plug as defined in claim 15 in the form of a tapered three-dimensional mass defining one end portion of enlarged cross section and a second end portion of a reduced cross section, said first portion disposed in the form of a stratum extending axially inwardly of said first end portion.

17. The plug as defined in claim 16 in which said water soluble material comprises substantially sodium chloride.

18. The plug as defined in claim 15 in which said water soluble rejuvenating agent comprises a mixture of sodium bisulfate and monosodium phosphate.

19. A method for generating a brine suitable for regenerating and rejuvenating water conditioning ion exchange resins which comprises the steps of providing an integral mass of salt in the form of a three-dimensional block having a stake hole extending inwardly of one surface thereof in which a mass of a water soluble rejuvenating agent is disposed, and contacting said block and said rejuvenating agent with an aqueous liquid to effect dissolution of said salt and said rejuvenating agent to form a brine.

* * * * *